United States Patent
Kasahara et al.

(10) Patent No.: US 8,999,493 B2
(45) Date of Patent: Apr. 7, 2015

(54) ADHESIVE PRODUCT, AND TRANSFER TOOL

(75) Inventors: Hiroyuki Kasahara, Osaka (JP); Kazushige Kawashita, Osaka (JP); Hideomi Yamamoto, Osaka (JP); Junichi Ohashi, Osaka (JP)

(73) Assignee: Kokuyo Co., Ltd., Osaka-Shi, Osaka (JP)

( * ) Notice: Subject to any disclaimer, the term of this patent is extended or adjusted under 35 U.S.C. 154(b) by 154 days.

(21) Appl. No.: 12/998,959

(22) PCT Filed: Dec. 14, 2009

(86) PCT No.: PCT/JP2009/070805
§ 371 (c)(1),
(2), (4) Date: Jun. 20, 2011

(87) PCT Pub. No.: WO2010/087079
PCT Pub. Date: Aug. 5, 2010

(65) Prior Publication Data
US 2011/0250408 A1  Oct. 13, 2011

(30) Foreign Application Priority Data
Jan. 29, 2009  (JP) ............... P2009-018834

(51) Int. Cl.
*C09J 7/02* (2006.01)
*B32B 3/10* (2006.01)
(Continued)

(52) U.S. Cl.
CPC ............... *B43M 5/00* (2013.01); *B65H 37/005* (2013.01); *B65H 2701/19402* (2013.01)

(58) Field of Classification Search
CPC ................. B43M 5/00; B65H 37/005; B65H 2701/19402

USPC .................................................... 428/195.1
See application file for complete search history.

(56) References Cited

U.S. PATENT DOCUMENTS

| 7,713,606 B2 | 5/2010 | Kasahara et al. |
| 2006/0165936 A1 * | 7/2006 | Kasahara et al. ............ 428/40.1 |
| 2009/0025866 A1 | 1/2009 | Kasahara et al. |

FOREIGN PATENT DOCUMENTS

| JP | 11-256109 A | 9/1999 |
| JP | 2002-188062 A | 7/2002 |

(Continued)

OTHER PUBLICATIONS

Machine Translation of JP 3125301.*
(Continued)

*Primary Examiner* — Gerard Higgins
*Assistant Examiner* — Sathavaram I Reddy
(74) *Attorney, Agent, or Firm* — McGinn IP Law Group, PLLC (57) ABSTRACT

A necessary and sufficient adhesive force of an adhesive agent layer is certainly kept while the dot diameter of the adhesive agent is made smaller and the thickness of the adhesive agent layer is made smaller. For the purpose, in an adhesive product, comprising an adhesive agent layer in which dots of a dot-form adhesive agent 12 are intermittently arranged, and a base material 11 which supports the adhesive agent layer, the dot diameter of the adhesive agent 12 is made into a very small value of less than 1.5 mm, and the thickness of the adhesive agent layer is set to less than 25 μm while the area ratio that is the proportion of an area where the adhesive agent 12 occupies per unit area of the base material 11 is set to 0.7 or more.

6 Claims, 10 Drawing Sheets

(51) Int. Cl.
*B43M 5/00* (2006.01)
*B65H 37/00* (2006.01)

(56) References Cited

FOREIGN PATENT DOCUMENTS

| | | |
|---|---|---|
| JP | 3123366 U | 7/2006 |
| JP | 2006-206657 A | 8/2006 |
| JP | 3125301 | 8/2006 |
| JP | 2001-192625 A | 7/2011 |
| WO | WO 2007/091567 A1 | 8/2007 |

OTHER PUBLICATIONS

"Tape Paste", "Paste Transfer Sheet/Dot Liner Label Memorandum", Kokuyo General Catalogue, 2009 version, Stationary volume, Kokuyo Co., Ltd., Dec. 2008, pp. 548-549.
Japanese Office Action dated Sep. 10, 2013.

* cited by examiner

| Sample No. | Compatative Example 1 | Compatative Example 2 | Compatative Example 3 | Compatative Example 4 | Example 1 | Example 2 | Example 3 | Example 4 |
|---|---|---|---|---|---|---|---|---|
| Dot diameter [mm] | 1.5 | 0.5 | 1.0 | 1.0 | 0.75 | 0.5 | 0.7 | 0.7 |
| Paint thickness [μm] | 37.3 | 15.4 | 22 | 7 | 17.3 | 10 | 12 | 12 |
| Adhesive force [N/25 mm] | 5.3 | 4.1 | 1.43 | 4.43 | 6.6 | 6.75 | 6.81 | 7.8 |
| Actual area ratio | 0.46 | 0.41 | 0.26 | 0.60 | 0.71 | 0.72 | 0.74 | 0.79 |
| Paper breaking generation ratio | 2/3 | No data | 3/3 | No data | 3/3 | 1/3 | 2/3 | 2/3 |

ADHESIVE PRODUCT, AND TRANSFER TOOL

TECHNICAL FIELD

The present invention relates to an adhesive product used to attach, for example, papers such as an envelope, or some other member.

BACKGROUND ART

For desk works, adhesive products in which an adhesive agent layer is provided on a base material (see, for example, Non-patent document 1 described below) are widely circulated. Such adhesive products are roughly classified to two types. The former are products in which an adhesive agent can be peeled from a base material, and adherends are attached onto each other in the state that the adhesive agent is transferred onto one of the adherends. A pressure-sensitive transfer (pressure-sensitive transfer adhesive) tape and a pressure-sensitive transfer sheet, which are each commercially available as the so-called tape paste, and others fall under this category. The latter include an adhesive tape or label in which an adhesive agent cannot be peeled from a base material and the base material itself is attached onto an adherend, and other members.

About a product in any one of these manners, importance is attached to pasting-off performance when the product is handled as well as adhesive force. As a manner effective for making pasting-off good, dot-pattern painting (see, for example, Patent document 1 described below), in which an adhesive agent is intermittently painted onto a base material, is adopted in a process for producing an adhesive product. Another advantage of the dot-pattern-painting is that air can be taken out from voids between pieces of the adhesive agent to effectively avoid a problem that air is confined between the adhesive agent and the adherend to generate bubbles or wrinkles.

In recent years, a request that the dot diameter of the adhesive agent should be made smaller and the layer thereof should be made thinner has been rising. As the dot diameter of the adhesive agent becomes smaller, a fear that the adhesive agent is pressed out of the adherend becomes weaker; thus, the adhesive agent layer becomes suitable for a delicate work to give an advantage for the attaching of a small member. It also becomes possible to form a pressure-sensitive transfer tape narrower in width. Additionally, as the adhesive agent layer becomes thinner, the amount of the pressure-sensitive transfer tape that can be wound around a reel having a fixed size, that is, the length of the tape becomes larger. About the finish of the adherend after it is attached, irregularities therein turn small so that the adherend becomes smooth. Furthermore, the total consumption of the adhesive agent is reduced.

However, when the dot diameter of the adhesive agent is made small and the thickness of the adhesive agent layer is made small, the adhesive force lowers and the adhesive strength weakens at once.

PRECEDENT TECHNICAL DOCUMENT

Patent Document

Patent document 1: JP-A-2006-206657

Non-Patent Document

Non-patent document 1: "Tape Paste", "Paste Transfer Sheet/Dot Liner Label Memorandum", Kokuyo General Catalogue, 2009 version, Stationary volume, Kokuyo Co., Ltd., 2008, December, pp. 548-549

SUMMARY OF THE INVENTION

Problems to be Solved by the Invention

An expected object of the invention that has been made in light of the above is to keep a necessary and sufficient adhesive force of an adhesive agent layer certainly, while the dot diameter of the adhesive agent is made smaller and the thickness of the adhesive agent layer is made smaller.

Means for Solving the Problems

The invention is an adhesive product, comprising an adhesive agent layer in which dots of a dot-form adhesive agent are intermittently arranged, and a base material which supports the adhesive agent layer, in which the dot diameter of the adhesive agent is made into a very small value of less than 1.5 mm, and the thickness of the adhesive agent layer is set to less than 25 µm while the area ratio that is the proportion of an area where the adhesive agent occupies per unit area of the base material is set to 0.7 or more. In this manner, a strong adhesive force can be certainly kept.

In a case where a paper piece is used as an adherend, there is generated a case where at the time of performing such a peeling action that an adhesive product or adhesive agent is peeled from the paper piece, the surface layer thereof is required to be certainly damaged. For example, when an important document is sent in the state of being put into an envelope, it is necessary from the viewpoint of securities, such as the protection of personal data and the preservation of secret matters to seal the envelope in order that it can be evidently discerned whether or not the envelope is opened by the third person. In other words, it is presumed that the envelope can be strongly sealed by attaching to such a degree that the surface of the envelope can be damaged when the third person tries to peel the adhesive agent layer. Alternatively, in bookbinding also, an adhesive product may be used to binds pages; in order that the removal or substitution of one or more of the pages or some other operation after bookbinding cannot be conducted to inhibit the forgery of description contents, it is necessary that a trace of the deprivation of the page(s) is caused to remain on the other pages.

Herein, such a state that a surface or surfaces of a paper piece are damaged is called a "paper-breaking", and further the following matter is called a "paper-breaking phenomenon": a matter that when an adhesive agent is peeled from a paper piece, at least one portion of a surface layer of the paper piece adheres onto the adhesive agent so that the paper piece is broken in the thickness direction thereof. The dot diameter of the above-mentioned adhesive agent is preferably set to 0.7 mm or more in order to certainly make, into a state which can turn to a paper-breaking state, each of various ordinarily used paper species, in particular, fine quality papers, which are used to hold and control an important document, or thick paper species, such as a white envelope higher in surface strength than the fine quality paper.

Additionally, in order to make the adhesive force stronger, it is preferred to set the thickness of the adhesive agent layer to 10 µm or more.

Advantageous Effects

According to the invention, a necessary and sufficient adhesive force can be certainly kept while the dot diameter of the adhesive agent is made small and the thickness of the adhesive agent layer is made small.

MODE FOR CARRYING OUT THE INVENTION

Figure 1:
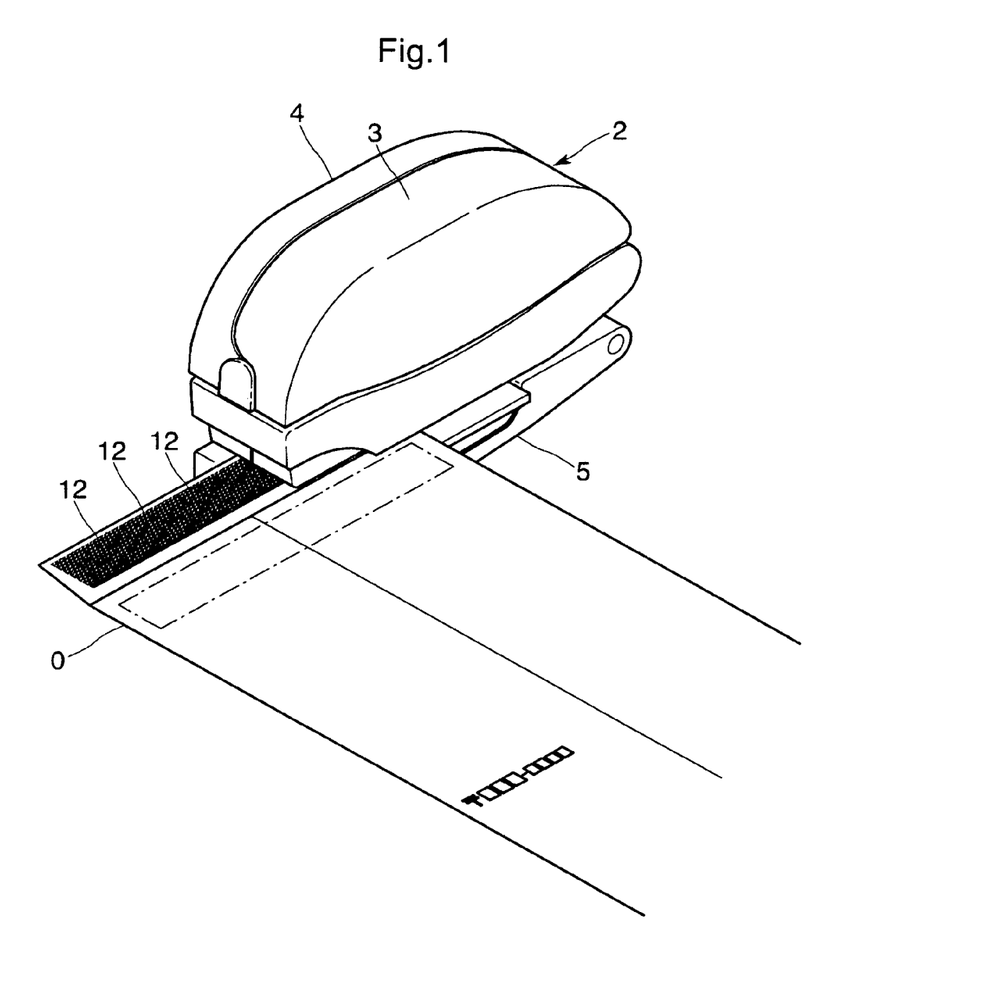
FIG. 1 The figure is a perspective view illustrating a transfer tool in an embodiment of the present invention.
Figure 2:
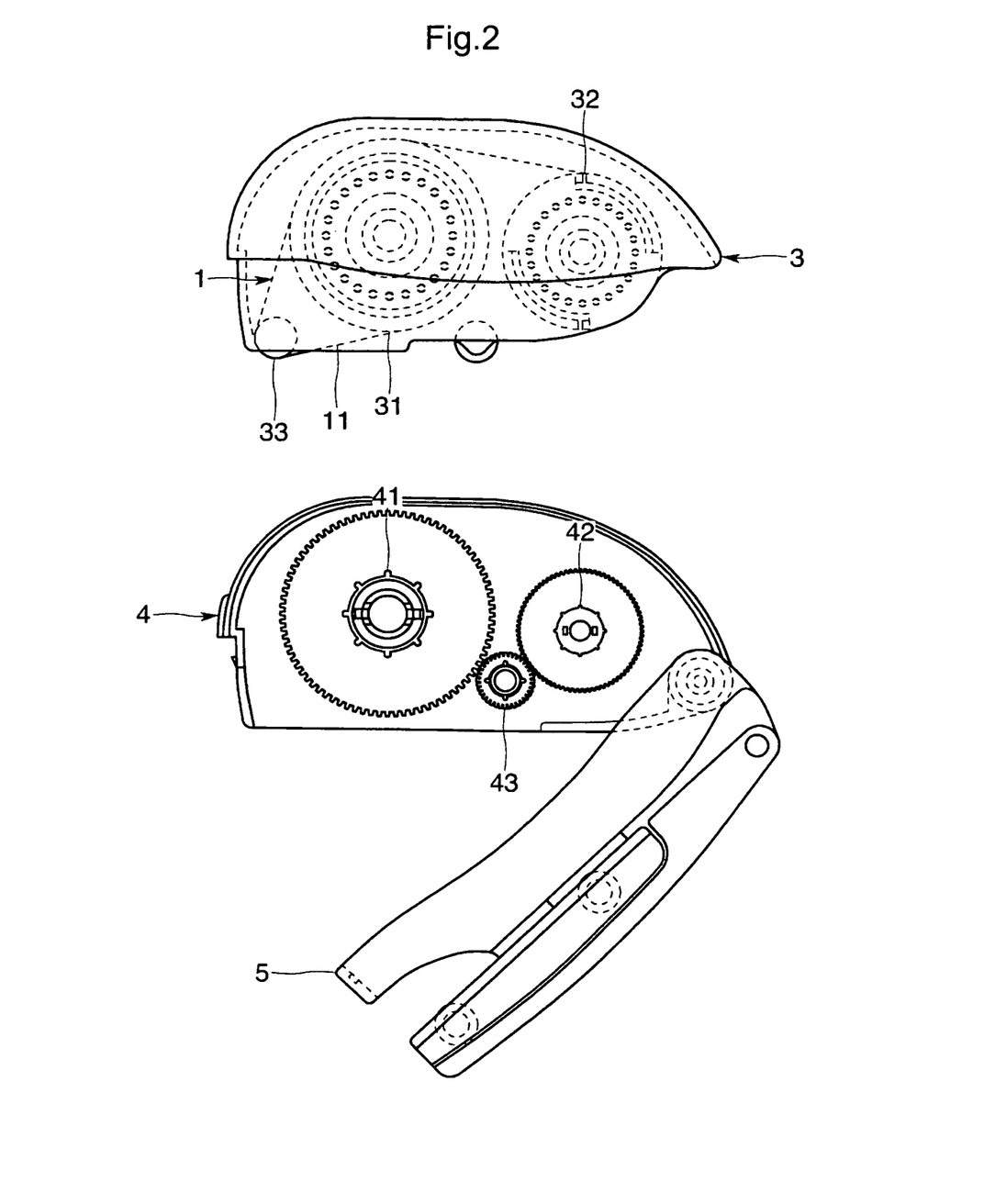
FIG. 2 The figure is an exploded side view illustrating a state that an adhesive product is taken out from the transfer tool of the embodiment.
Figure 3:
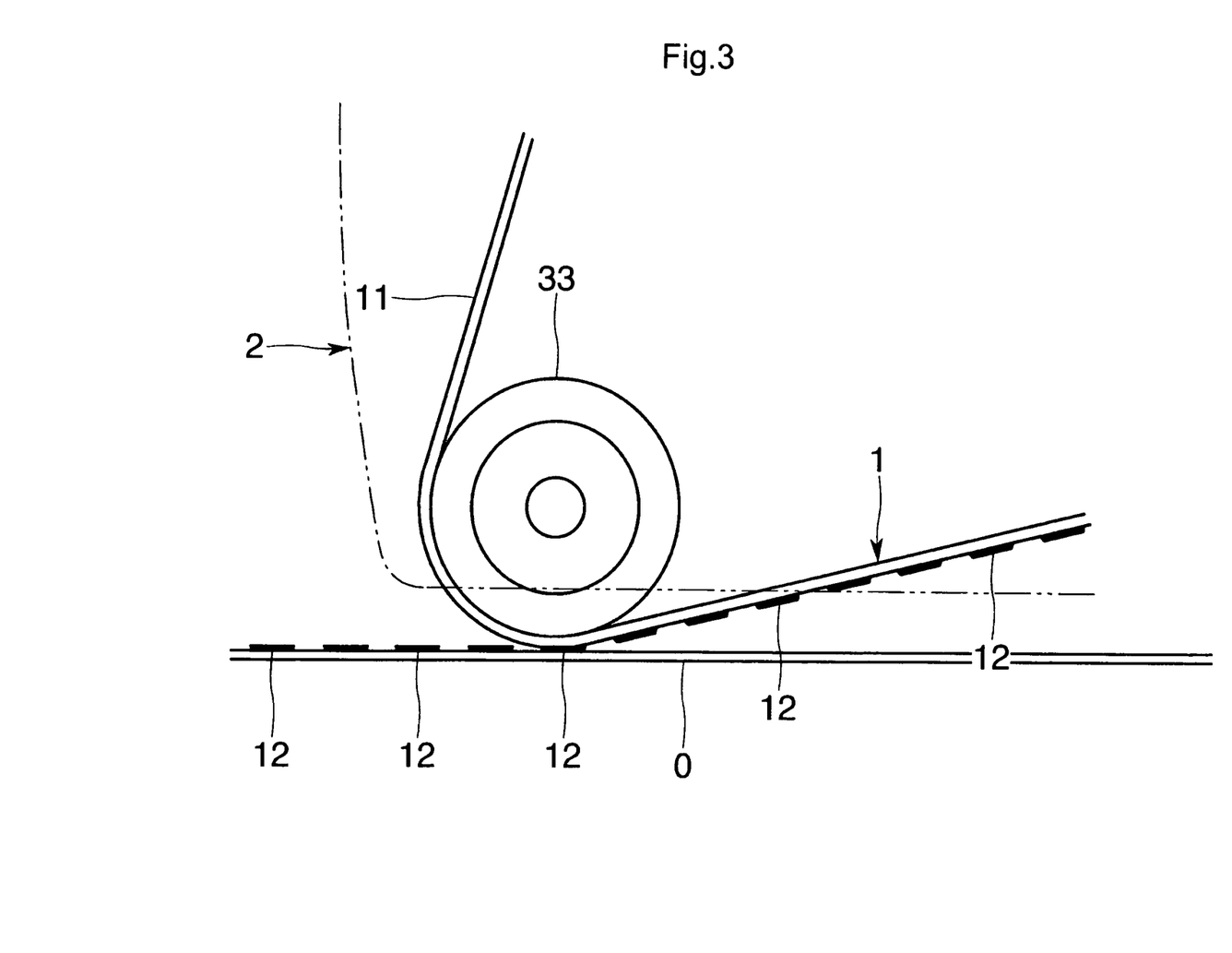
FIG. 3 The figure is a main-region-enlarged side view illustrating the transfer tool and the adhesive product of the embodiment.

With reference to the drawings, an embodiment of the present invention will be described. A member illustrated in FIGS. 1 to 3 is a transfer tool 2 having a pressure-sensitive transfer tape 1 which is an adhesive product. This transfer tool 2 has, as main constituting elements, a refill cartridge 3 having a winding reel 31 and a take-up reel 32 of the pressure-sensitive transfer tape 1; a body case 4 into which the refill cartridge 3 is fitted to hold this cartridge; and an arm 5 connected rotatably through a hinge to the body case 4.

To the body case 4 are set a main wheel 41 which supports the winding reel 31, an auxiliary wheel 42 which supports the take-up reel 32, and a gear 43 interposed between the two wheels 41 and 42. By the wheels 41 and 42 and the gear 43, the take-up reel 32 is rotated, following the rotation of the winding reel 31.

The arm 5 takes charge of grasping an adherend O, to which an adhesive agent 12 is to be transferred, together with the body case 4 (and the refill cartridge 3 fitted to the case).

As illustrated in FIG. 3, while a turning-back piece of the adherend (for example, an envelope) O is grasped, this envelope O is slid to be shifted relatively to the transfer tool 2. As a result, the pressure-sensitive transfer tape 1 wound and stretched on a transfer head 33 is pushed on the turning-back piece so that an adhesive agent 12 applied onto the front surface of a base material 11 of the pressure-sensitive transfer tape 1 is transferred onto the turning-back piece of the envelope O. At this time, the pressure-sensitive transfer tape 1 is successively reeled off from the winding reel 31 to be wound through the transfer head 33 onto the take-up reel 32. After the adhesive agent 12 is transferred, the turning-back piece is turned back to close and seal an opening end of the envelope. In the state that the adhesive agent 12 is sandwiched between the turning-back piece and the vicinity of the opening, the two are brought into contact with each other under pressure, so that the turning-back piece is attached onto the opening vicinity. As a result, the envelope O is sealed.

Figure 4:
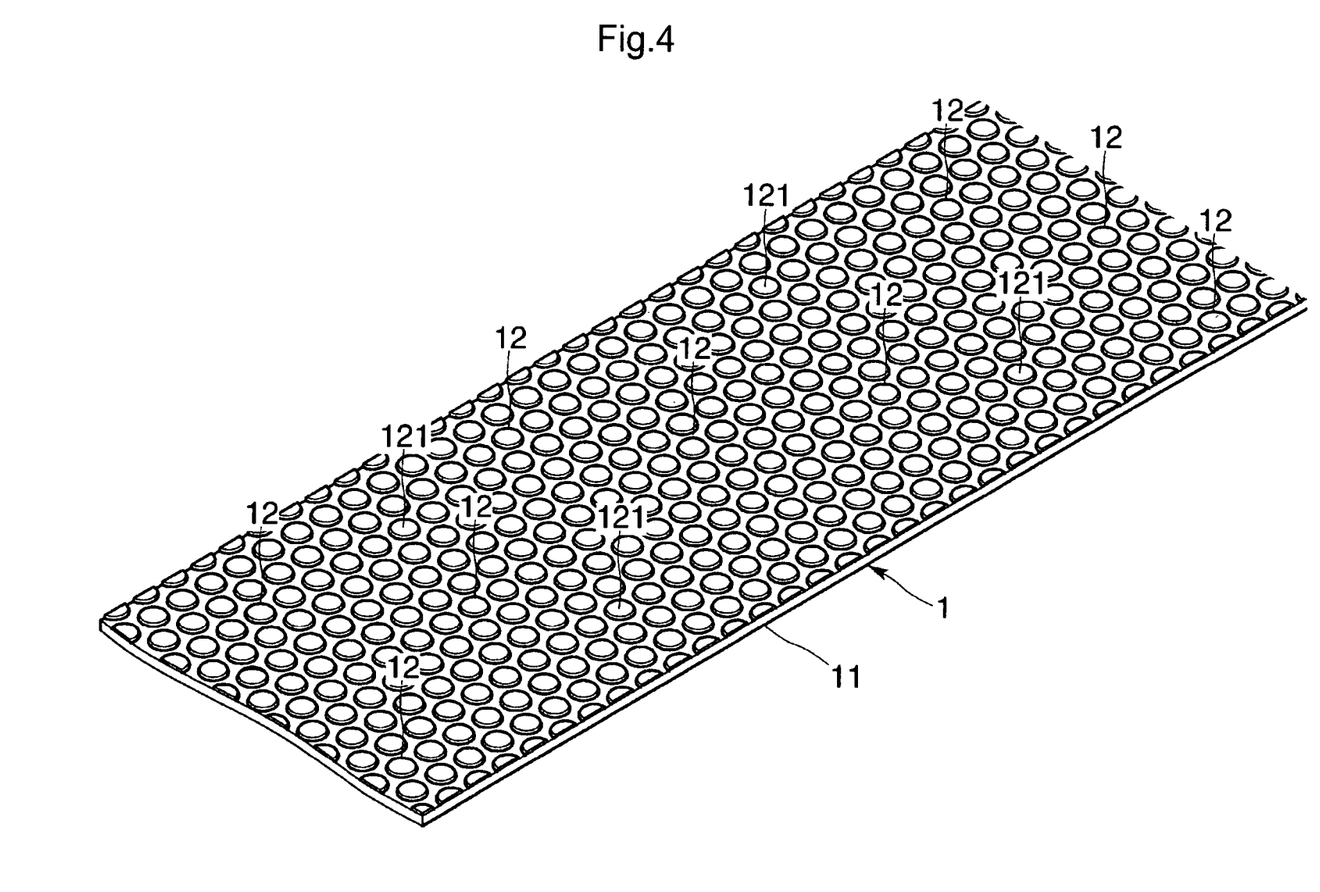
FIG. 4 The figure is a main-region-enlarged perspective view illustrating the adhesive product in the embodiment.
Figure 5:
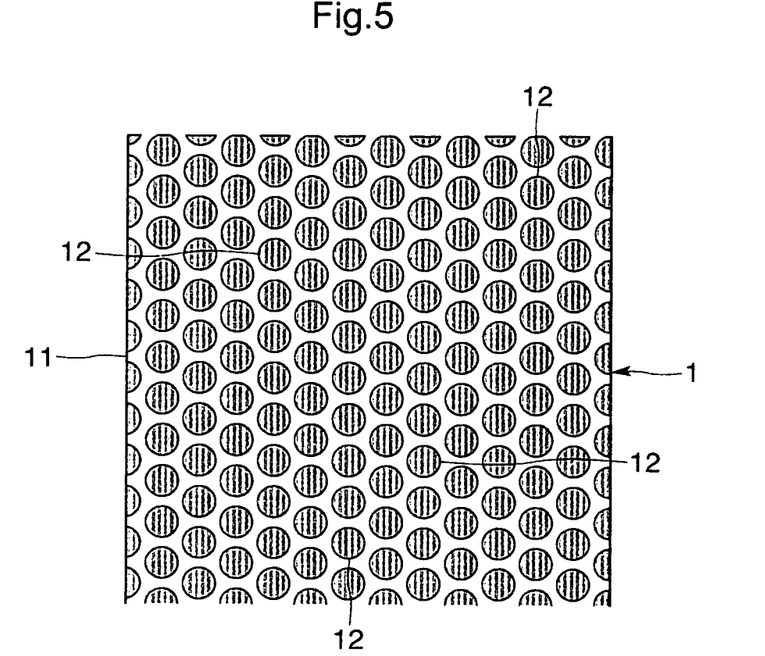
FIG. 5 The figure is a main-region plan view of the adhesive product of the embodiment.
Figure 6:
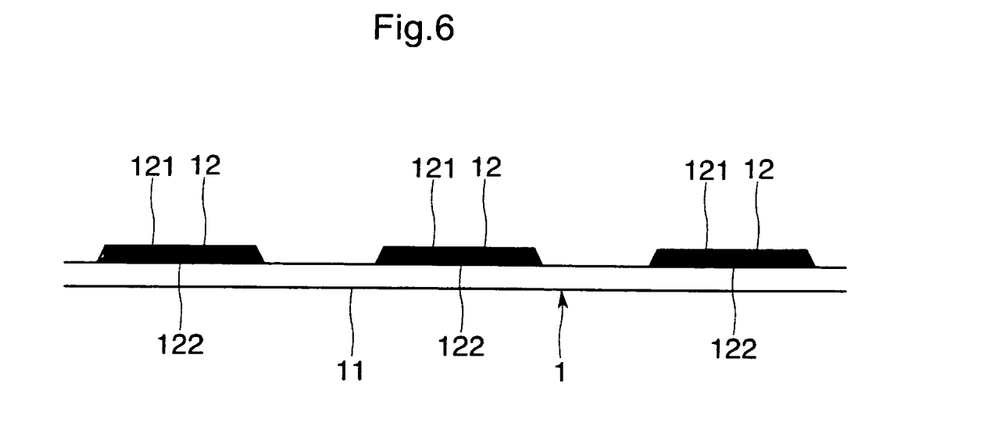
FIG. 6 The figure is a main-region-enlarged side view of the adhesive product of the embodiment.

A detailed description is made about the pressure-sensitive transfer tape 1. As illustrated in FIGS. 4 to 6, the pressure-sensitive transfer tape 1 is equipped with the base material 11 which is obtained by shaping a film into a long tape form, and an adhesive agent layer in which the adhesive agent 12 is painted into a pattern of dots on the front surface of the base material 11.

The film of the base material is, for example, a polyethylene terephthalate film, and may be any film on which the adhesive agent 12 can be peelably supported. The film may be a film of a plastic such as polyethylene, polypropylene or polyvinyl chloride, a glassine paper piece, or a metallic foil piece. It is allowable to adopt the base material 11 which is a base material in which a peelable layer made of silicone resin, fluorine-contained resin or the like is laid on a front surface of a member having no peeling effect to give a peeling effect thereto.

The adhesive agent layer is a layer in which the dots of the dot-form adhesive agent 12 are intermittently arranged on the base material 11. The type of the adhesive agent 12 may be any type, such as an acrylic, styrene, rubber, silicone, rosin, or urethane type. It is preferred to use an acrylic adhesive agent, which contains an acrylic copolymer, in order to paint the agent precisely and efficiently onto the base material 11 by a known printing method such as screen-printing or gravure printing.

An adhesive agent composition particularly good in heat resistance and weather resistance, which are necessary at the time of producing or storing, and good in adhesive force and cohesive force is a composition containing an acrylic triblock copolymer. The acrylic triblock copolymer is a triblock copolymer represented by the following formula: A-B-A or A-B-C wherein A, B and C are polymer blocks different from each other.

In the acrylic triblock copolymer, it is more preferable that at least one of the polymer blocks A, B and C is made of alkyl acrylate units and/or alkyl methacrylate units. Even more preferably, all the polymer blocks A, B and C are each made of alkyl acrylate units and/or alkyl methacrylate units. In particular preferably, the polymer block A is made of alkyl methacrylates, the polymer block B is made of alkyl acrylate, and the polymer block C is made of alkyl methacrylates or alkyl acrylates.

Particularly preferred examples of the acrylic triblock copolymer are triblock copolymers each represented by the structure of the formula of A-B-A or A-B-C, such as polymethyl methacrylate-b-polyacrylic asid n-butyl-b-polymethyl methacrylate, polymethyl methacrylate-b-polyethyl acrylate-b-polymethyl methacrylate, polymethyl methacrylate-b-polyacrylic acid n-butyl-b-polymethyl acrylate, polymethyl methacrylate-b-polyacrylic asid n-butyl acrylate-b-polyethyl acrylate, and polymethyl methacrylate-b-polyacrylic asid 2-ethylhexyl-b-polymethyl methacrylate.

The acrylic adhesive agent may be made only of the above-mentioned triblock copolymer, or may be composed of the copolymer and one or more appropriately incorporated different components. The component(s), which may be incorporated into the acrylic adhesive agent, would (each) be an acrylic diblock copolymer, an adhesiveness supplier or some other from the viewpoint of good compatibility with the triblock copolymer, an improvement in the uniformity, and the acquisition of an adhesive agent better in heat resistance and weather resistance.

The acrylic diblock copolymer is a diblock copolymer represented by the following general formula: X-Y wherein X represents a polymer block made mainly of alkyl methacrylate units each having an alkyl group having 1 to 4 carbon atoms, or an alkyl group having a cyclic structure, and Y represents a polymer block made mainly of alkyl acrylate units each having an alkyl group having 1 to 20 carbon atoms, and/or alkyl methacrylate units each having an alkyl group having 5 to 20 carbon atoms. The copolymer is preferably a diblock copolymer wherein the polymer block X is made mainly of alkyl methacrylate units each having an alkyl group having 1 to 4 carbon atoms, and the polymer block Y is made mainly of alkyl acrylate units each having an alkyl group having 1 to 20 carbon atoms.

In the polymer block X, examples of the alkyl group having 1 to 4 carbon atoms include methyl, ethyl, n-propyl, isopropyl, n-butyl, sec-butyl, isobutyl, and tert-butyl groups. Examples of the alkyl group having a cyclic structure include cyclopropyl, cyclobutyl, cyclopentyl, cyclohexyl and cycloheptyl, and isobornyl groups. These groups may each have a substituent, and examples of the substituent include alkoxy groups such as methoxy, ethoxy, n-propoxy, isopropoxy and tert-butoxy groups, amino groups such as N, N-dimethylamino and N,N-diethylamino groups, and halogen atoms such as chlorine, bromine and fluorine.

Examples of the monomer which constitutes each of the alkyl methacrylate units having an alkyl group having 1 to 4 carbon atoms or an alkyl group having a cyclic structure include methyl methacrylate, ethyl methacrylate, isopropyl methacrylate, sec-butyl methacrylate, isobutyl methacrylate, tert-butyl methacrylate, cyclohexyl methacrylate, isobornyl methacrylate, 2-methoxyethyl methacrylate, 2-(N,N-dimethylamino) ethyl methacrylate, and trifluoromethyl methacrylate. These may be used alone or in combination of two or more thereof.

The polymer block represented by X in the general formula may contain only alkyl methacrylate units. However, the polymer block may contain one or more monomer units different from the alkyl methacrylate units each having an alkyl group having 1 to 4 carbon atoms or an alkyl group having a cyclic structure as far as the proportion thereof is such a small proportion that the advantageous effects are not damaged (usually, 20% or less by mass of the total of the polymer block X). Examples of the different monomer unit(s) include alkyl methacrylates each having 5 or more carbon atoms, such as 2-ethylhexyl methacrylate and dodecyl methacrylate; alkyl acrylates such as methyl acrylate, n-butyl acrylate, and t-butyl acrylate; methacrylic acid esters other than any alkyl ester, such as trimethylsilylmethacrylate; acrylic acid esters other than any alkyl ester, such as trimethylsilyl acrylate; methacrylamides such as methacrylamide, N-methylmethacrylamide, N-ethylmethacrylamide, N-isopropylmethacrylamide, N,N-dimethylmethacrylamide, and N,N-diethylmethacrylamide; acrylamides such as acrylamide, N-methylacrylamide, N-ethylacrylamide, N-isopropylacrylamide, N,N-dimethylacrylamide, and N,N-diethylacrylamide; vinyl monomers each having a carboxyl group, such as methacrylic acid, acrylic acid, crotonic acid, maleic acid, maleic anhydride, and fumaric acid; aromatic vinyl monomers such as styrene, α-methylstyrene, and p-methylstyrene; conjugated diene monomers such as butadiene, and isoprene; olefins such as ethylene, and propylene; and constituting components each derived from a lactone, such as ε-caprolactone or valerolactone, or some other monomer.

In the polymer block Y, examples of the alkyl group having 1 to 20 carbon atoms include methyl, ethyl, n-propyl, isopropyl, n-butyl, isobutyl, sec-butyl, tert-butyl, 2-methylbutyl, 3-methylbutyl, n-octyl, 2-ethylhexyl, isononyl, dodecyl, tridecyl, and stearyl groups. Examples of the alkyl group having 5 to 20 carbon atoms include n-pentyl, 2-methylbutyl, 3-methylbutyl, n-octyl, 2-ethylhexyl, dodecyl, and stearyl groups. These groups may each have a substituent. Examples of the substituent include alkoxy groups such as methoxy, ethoxy, n-propoxy, isopropoxy and tert-butoxy groups, amino groups such as N,N-dimethylamino and N,N-diethylamino groups, and halogen atoms such as chlorine, bromine and fluorine.

Examples of the monomer that constitutes each of the alkyl acrylate units each having an alkyl group having 1 to 20 carbon atoms include methyl acrylate, ethyl acrylate, n-propyl acrylate, isopropyl acrylate, n-butyl acrylate, isobutyl acrylate, sec-butyl acrylate, tert-butyl acrylate, n-hexyl acrylate, 2-ethylhexyl acrylate, dodecyl acrylate, tridecyl acrylate, stearyl acrylate, 2-methoxyethyl acrylate, 2-(N,N-dimethylamino)ethyl acrylate, trifluoromethyl acrylate, and trimethoxysilylpropyl acrylate. These may be used alone or in combination of two or more thereof.

Examples of the monomer that constitutes each of the alkyl methacrylate units each having an alkyl group having 5 to 20 carbon atoms include n-pentyl methacrylate, n-hexyl methacrylate, 2-ethylhexyl methacrylate, dodecyl methacrylate, tridecyl methacrylate, stearyl methacrylate, 2-methoxypentyl methacrylate, 2-(N,N-dimethylamino)pentyl methacrylate, perfluoropentyl methacrylate, and 2-trimethoxysilylpentyl methacrylate. These may be used alone or in combination of two or more thereof.

The polymer block represented by Y in the general formula may contain only the alkyl acrylate units each having an alkyl group having 1 to 20 carbon atoms and/or the alkyl methacrylate units each having an alkyl group having 5 to 20 carbon atoms. However, the polymer block may contain one or more monomer units different from the alkyl acrylate units each having an alkyl group having 1 to 20 carbon atoms and/or the alkyl methacrylate units each having an alkyl group having 5 to 20 carbon atoms as far as the proportion thereof is such a small proportion that the advantageous effects are not damaged (20% or less by mass of the total of the polymer block Y). Examples of the different monomer unit(s) include alkyl acrylates each having an alkyl group having 21 or more carbon atoms; alkyl methacrylates each having an alkyl group having 1 to 4 carbon atoms; alkyl methacrylates each having an alkyl group having 21 or more carbon atoms; methacrylates other than any alkyl ester, such as trimethylsilyl methacrylate; acrylates other than any alkyl ester, such as trimethylsilyl acrylate; methacrylamides such as methacrylamide, N-methylmethacrylamide, N-ethylmethacrylamide, N-isopropylmethacrylamide, N,N-dimethylmethacrylamide, and N,N-diethylmethacrylamide; acrylamides such as acrylamide, N-methylacrylamide, N-ethylacrylamide, N-isopropylacrylamide, N,N-dimethylacrylamide, and N,N-diethylacrylamide; vinyl monomers each having a carboxyl group, such as methacrylic acid, acrylic acid, crotonic acid, maleic acid, maleic anhydride, and fumaric acid; aromatic vinyl monomers such as styrene, α-methylstyrene, and p-methylstyrene; conjugated diene monomers such as butadiene, and isoprene; olefins such as ethylene, and propylene; and constituting components each derived from a lactone, such as ε-caprolactone or valerolactone, or some other monomer.

As the need arises, the diblock copolymer represented by the general formula may have, in any side chain or a main chain terminal of the molecule thereof, a functional group such as a hydroxyl, carboxyl, acid anhydride, amino, or trimethoxysilyl group.

In order to improve the tackiness, the adhesive force and the holding force (of the adhesive agent layer), and make the adjustment thereof easy, it is preferred to blend an adhesiveness supplier with the acrylic adhesive agent. Blendable examples of the adhesiveness supplier include rosin derivatives such as rosin esters, gum rosin, tall oil rosin, hydrogenated rosin esters, maleic-acid-modified rosin and disproportioned rosin esters, terpene phenol resin, terpene based resins each made mainly of α-pinene, β-pinene, limonene or some other, (hydrogenated) petroleum resin, coumarone-indene resin, hydrogenated aromatic copolymers, styrene based resins, phenolic resins, and xylene-based resin. These may be used alone or in combination of two or more thereof.

As to whether or not the diblock copolymer, the triblock copolymer or the adhesiveness supplier is blended, and the blend proportions thereof, an appropriate selection may be made without any especial restriction in accordance with the usage of the adhesive product, the kind of the adherend and other.

The adhesive agent 12 may be an emulsion type adhesive agent or a hot melt type adhesive agent.

The adhesive agent 12 is painted into a pattern of dots on the base material 11 by screen-printing, gravure printing, offset printing, flexography or some other method. About each of the dots 12 of the adhesive agent, the area of the lower bottom surface 122 thereof that faces the base material 11 directly is larger than that of the upper bottom surface 121 opposite to the surface 122. Between the dots 12 of the adhesive agent, voids are interposed in order to make the pasting-off and air-releasing better.

In the embodiment, importance is attached to a matter that the dot diameter of the adhesive agent 12 is made into a very small value of less than 1.5 mm, and further a required adhesive force is certainly kept while the thickness of the adhesive agent layer is controlled into less than 25 μm. Hereinafter, an investigation is made about conditions capable of exhibiting a strong adhesive force by way of specific examples and comparative examples.

Figure 7:
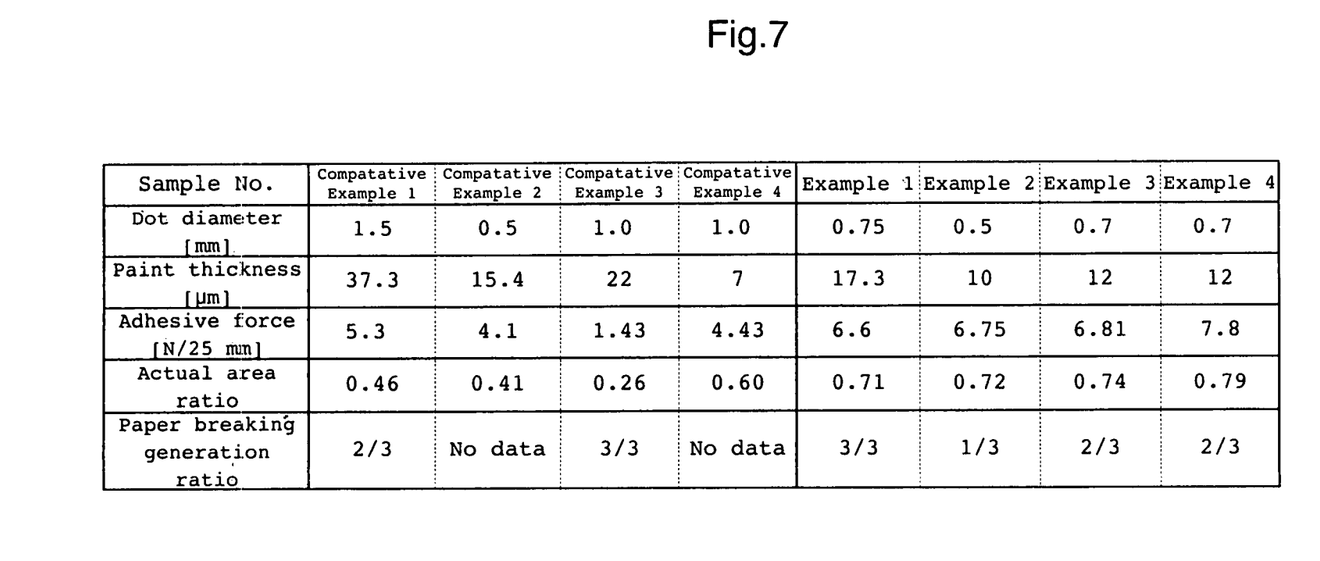
FIG. 7 The figure is a table showing measurement test results of adhesive products of examples and comparative examples.

FIG. 7 shows measurement results of the adhesive force of each of Examples 1 to 4 and Comparative Examples 1 to 4. Any one of the examples and the comparative examples is an acrylic emulsion type adhesive agent. In each of the examples, the actual area ratio of the adhesive agent 12 is 0.7 or more, and in each of the comparative examples, the actual area ratio of the adhesive agent 12 is less than 0.7. Except for Comparative Example 1, the dot diameter of the adhesive agent 12 is less than 1.5 mm, and the thickness of the adhesive agent layer is less than 25 μm. Comparative Example 1 is the current product produced and sold at present by the Applicant.

In the figure, the area ratio denotes the ratio of the area occupied by the adhesive agent 12 painted on a unit area of the base material 11. When the area ratio is 0.7, the area occupied by the painted adhesive agent 12 (the total area of the dots 12) relative to the base material 11 area, the value of which is one, is 0.7. If the adhesive agent 12 is daubed on the base material all over, the area ratio will be 1.

As described above, about each of the dots 12 of the adhesive agent on the base material 11, the area of the upper bottom surface 121 is smaller than that of the lower bottom surface 122. It is expected that the adhesive force of the adhesive agent 12 depends on the area of the smaller surface, that is, the upper bottom surface 121; thus, the ratio of the area occupied by the upper bottom surface 121 per unit area of the base material 11 is measured as the actual area ratio. In order to measure the actual area ratio, a microscope VHX manufactured by Keyence Corp. is used, and regions of the upper bottom surfaces 121 of the adhesive agent dots 12 are detected from an image of the adhesive product taken through the microscope, the image being an image viewed from the above, and then the upper bottom surfaces 121 are approximated to polygons. In this way, the ratio of the area of the upper bottom surface 121 to the area of the base material 11 is calculated out.

Against the actual area ratio, the plate area ratio is the ratio of the area occupied by the adhesive agent 12 in a plate used for the dot-pattern-printing onto the base material 11. Except for Example 1, the actual area ratio tends to be smaller than the plate area ratio.

The dot diameter is the diameter of each of the dots 12 of the adhesive agent painted onto the base material 11. When any one of the dots 12 is in a non-complete circular form, the diameter of the circumscribed circle of the dot 12 (when the dot is in an elliptic form, the long diameter) is defined as the dot diameter. About the dot diameter also, the diameter of the upper surface 121 detected from an image of the adhesive product, the image being an image viewed from the above, is measured as the actual dot diameter.

The paint thickness is the thickness of the painted adhesive agent layer. The measurement of the paint thickness and that of the adhesive force are in principle made in accordance with JIS Z 0237: 2000. The pre-treatment of a test piece of the adhesive product and the preparation of the test piece are in accordance with JIS Z 0237: 2000. For the measurement of the paint thickness, use is made of a constant-pressure thickness-measuring instrument, PF-02, manufactured by TECLOK Corp., which is fitted to JIS Z 1702-1994. In JIS Z 0237: 2000, it is prescribed that the force for the measurement is set to about 0.8 N. However, in the present measurement test, the measurement force is set to 1226 mN (125 g). In order to measure the paint thickness of the adhesive agent layer, the thickness of the whole of the adhesive product (the base material 11 and the adhesive agent layer), and that of the base material 11 are each measured, and then the latter is subtracted from the former.

About the adhesive force, a test piece 25 mm in width is prepared in which the adhesive agent 12 of the adhesive product (in particular, the pressure-sensitive transfer tape 1) is transferred on a polyethylene terephthalate film (provided that when the adhesive agent 12 cannot be peeled from the base material 11, the base material 11 is used as it is). A measurement is then made about the adhesive force for 180-degree-peeling of this test piece from a test plate. As a tester therefor, use is made of a tester fitted to JIS B 7721, or a tester equivalent thereto. In the present measurement test, an autograph, EZ-S, manufactured by Shimadzu Corp. is used. The test plate used is a SUS 304 steel sheet, and the steel sheet is polished with a water-resistant polishing paper sheet No. 360. A roller about 45 mm in width and 2 kg in weight is used to attach the test piece onto the test plate under pressure (pressure-attaching rate: about 20 mm/s, and times of the pressure-attaching operation: 2 reciprocations), and then a measurement is made in which the test piece is peeled at a rate of 300 mm/min within a period of 20 to 40 minutes.

A paper-breaking test is made using, as testing sheets, a white envelope (its front surface 18A and its rear surface 18A) and a brown envelope (its front surface 14A and its rear surface 14A). Numerical values about the surfaces 18A, 14A, and the others are values obtained by examining the respective surface strengths of the envelope sheets by a wax-using method in accordance with methods in JIS P 8129-1976 for testing the surface strength of a paper piece and that of a paperboard. In the paper-breaking test, prepared are test pieces in which of each the adhesive agent 12 of the pressure-sensitive transfer tape 1 is transferred on a paper piece in the form of a strip 8.4 mm in width (provided that only in Comparative Example 3, the width is 6 mm) obtained by cutting each of the envelopes. Three of the test pieces that are arranged in parallel are adhered onto another envelope paper piece, and then a roller about 45 mm in width and 2 kg in weight is used to attach the envelope paper pieces onto the envelope paper piece under pressure (pressure-attaching rate: about 20 mm/s, and times of the pressure-attaching operation: 2 reciprocations). After 20 minutes therefrom, the individual test pieces are successively peeled off at a rate of 1000 mm/min to check whether or not paper-breaking is caused. The paper-breaking referred to herein means that any one of the test pieces is peeled in the state that the front surface region of the test piece adheres and remains onto the adhesive agent 12. In the paper-breaking test, which is made about the plural test pieces, the generation ratio of paper-breaking is examined. About the paper-breaking generation ratio, the denominator is the total number of the test pieces, and the numerator thereof is the number of the test pieces in paper-breaking out of the test pieces.

Figure 8:
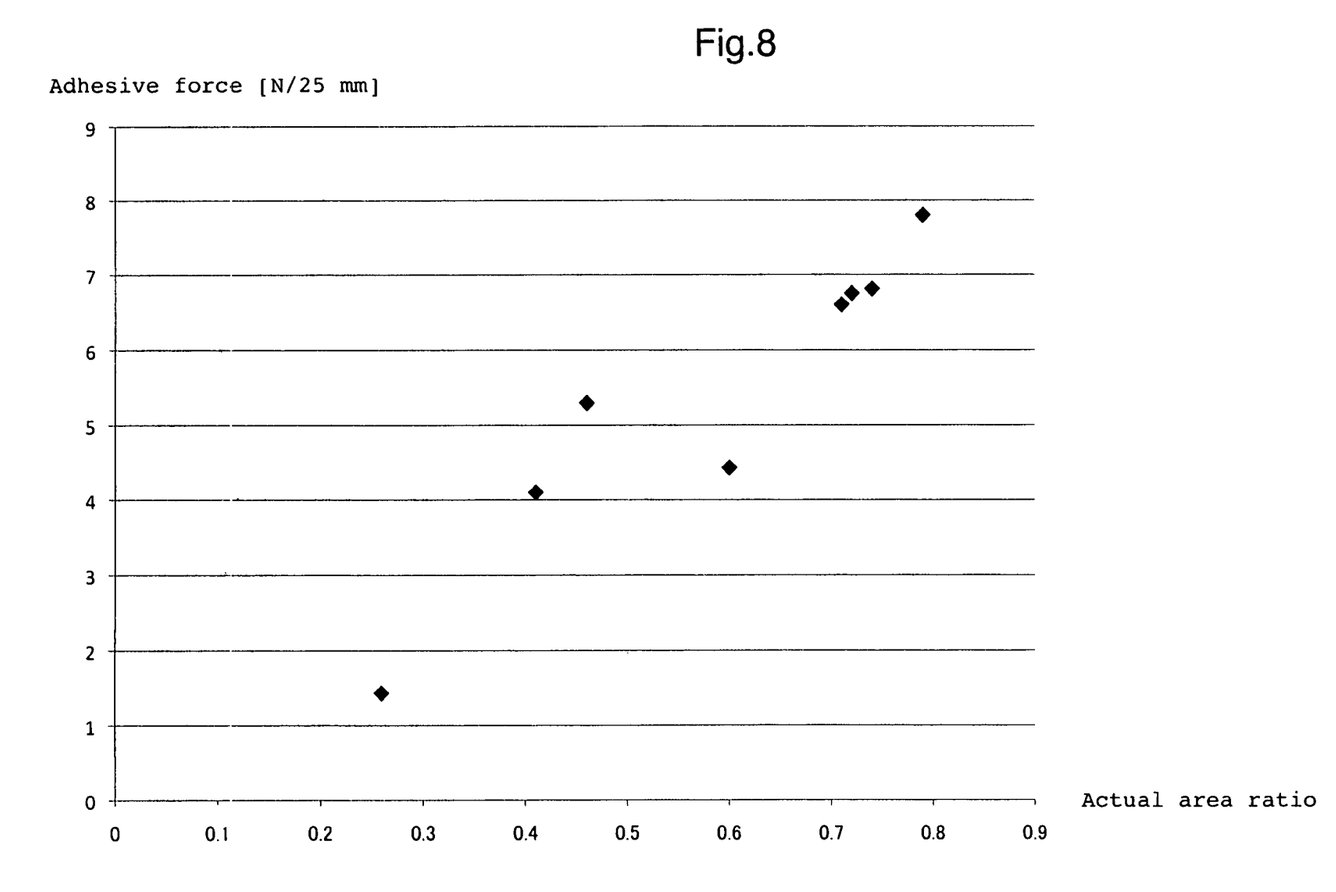
FIG. 8 The figure is a graph showing measurement test results of the adhesive products of the examples and the comparative examples.

FIG. 8 shows a relationship between the actual area ratio of the adhesive agent 12 and the adhesive force thereof. In the figure, the transverse axis represents the actual area ratio, and the vertical axis represents the adhesive force. Recognized is the fact that near a point where the actual area ratio is over about 0.7, the adhesive force is greatly improved.

Figure 9:
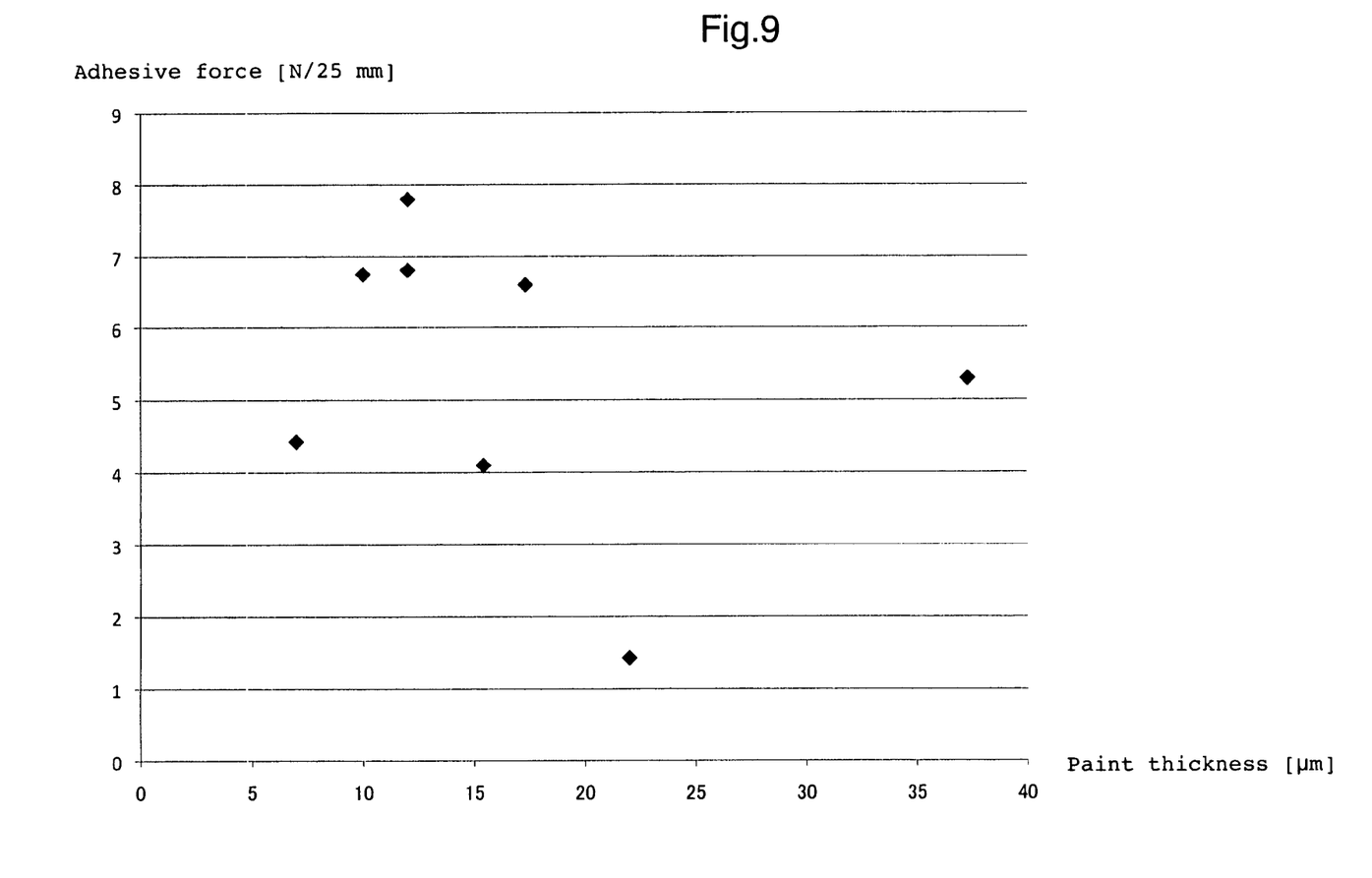
FIG. 9 The figure is a graph showing measurement test results of the adhesive products of the examples and the comparative examples.

FIG. 9 shows a relationship between the paint thickness of the adhesive agent layer and the adhesive force. In the figure, the transverse axis represents the paint thickness, and the vertical axis represents the adhesive force. Between the paint thickness and the adhesive force, a clear correlative relationship is not observed. In order to cause a strong adhesive force to be exhibited while the paint thickness of the adhesive agent layer is made small, it is effective to set the paint area ratio of the dot pattern painted on the base material 11 to 0.7 or more.

In the meantime, in order to make the pasting-off performance good, it is desired to control the paint area ratio to about 0.9 or less. If the paint area ratio of the adhesive agent 12 is more than 0.94 or 0.95, the dots 12 of the adhesive agent 12, which should be apart from each other through the voids interposed therebetween, are easily attached to each other so that a sufficient pasting-off performance is unfavorably obtained.

When attention is paid to paper-breaking phenomena, the paper-breaking phenomenon generation ratio is low in Example 2, in which the actual dot diameter is 0.5. When papers are attached, it is preferred for inviting paper-breaking certainly to set the dot diameter of the adhesive agent 12 to 0.7 mm or more. When the dot diameter is set to 0.75 mm or more, a paper-breaking phenomenon is generated with a higher certainty.

Additionally, in order to strengthen the adhesive force, it would be preferred to keep the adhesive agent layer certainly into a thickness of 10 μm or more.

Figure 10:
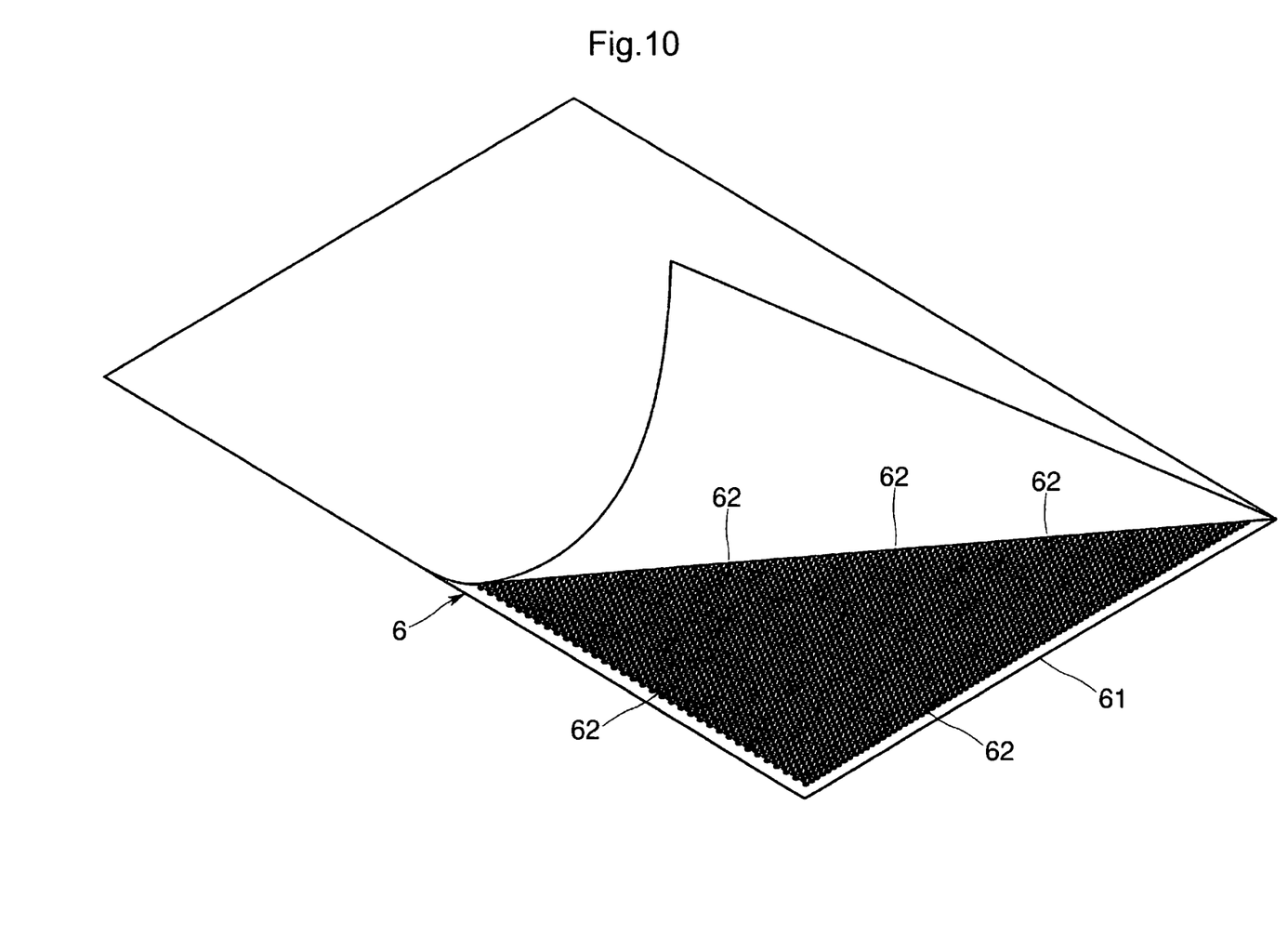
FIG. 10 The figure is a perspective view illustrating a variation example of the present invention.
Figure 11:
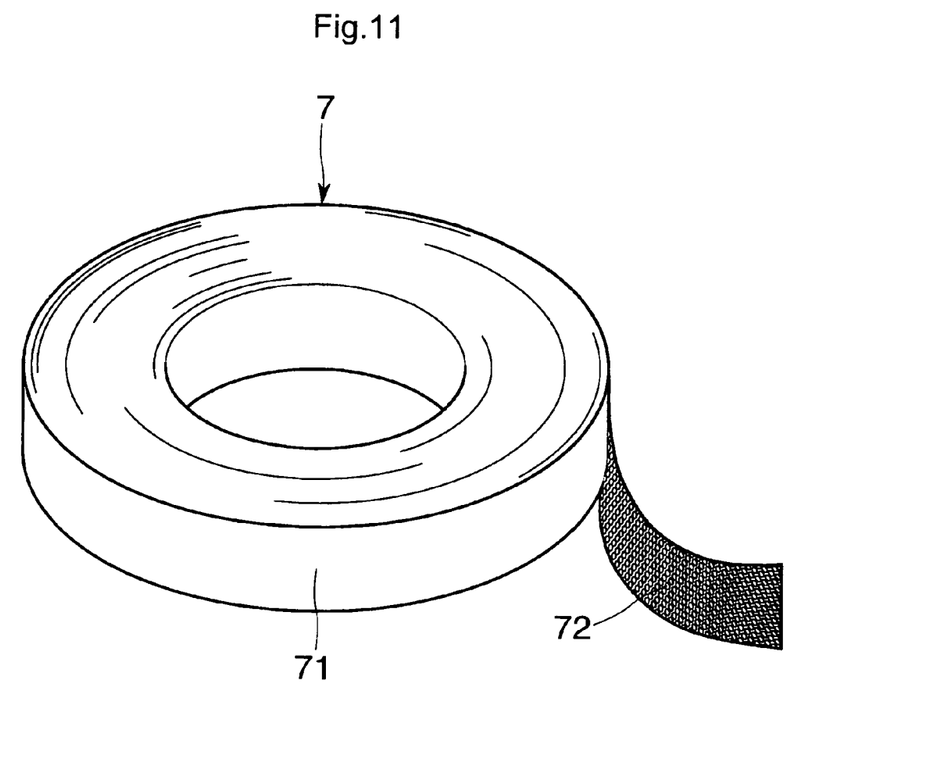
FIG. 11 The figure is a perspective view illustrating a variation example of the present invention.

The present invention is not limited to the embodiments described above in detail. In particular, the embodiment of the adhesive product is not limited to any pressure-sensitive adhesive tape used together with the transfer tool 2. It can be conceived that given are a pressure-sensitive transfer sheet 6 wherein as illustrated in FIG. 10, a peelable adhesive agent 62 is painted into a dot pattern on a base material 61; an adhesive tape 7 wherein as illustrated in FIG. 11, an adhesive agent 72 is painted into a dot pattern on a base material 71 not to be peelable; a label paper sheet (not illustrated); or some other adhesive product.

A specific structure of each of other regions can be variously modified within a scope that does not depart from the subject matter of the present invention.

INDUSTRIAL APPLICABILITY

The adhesive product of the present invention may be used as a pressure-sensitive transfer paste used to attach a paper or any other member, and may be used as an adhesive tape, a label paper, or some other.

NUMERICAL REFERENCES 1, 6, 7 . . . adhesive product
11, 61, 71 . . . base material
12, 62, 72 . . . adhesive agent (dots thereof)
2 . . . transfer tool

The invention claimed is:

1. An adhesive product, comprising:
an adhesive agent layer in which dots of a dot-form adhesive agent are intermittently arranged; and
a base material which supports the adhesive agent layer,
wherein a dot diameter of the dot-form adhesive agent is in a range from 0.50 mm to 0.75 mm,
wherein a thickness of the adhesive agent layer is equal to or more than 10 μm, and is equal to or less than 17.3 μm,
wherein an area ratio of the dot-form adhesive agent is in a range from 0.70 to 0.79, the area ratio denoting a ratio of an area occupied by the dot-form adhesive agent painted on a unit area of the base material,
wherein an area of an upper surface of the dot-form adhesive agent is considered as the area occupied by the dot-form adhesive agent for the area ratio of the dot-form adhesive agent,
wherein the upper surface of the dot-form adhesive agent is an opposite side surface of a lower surface of the dot-form adhesive agent, and
wherein the lower surface of the dot-form adhesive agent sticks to the base material, and wherein an area of the lower surface of the dot-form adhesive agent is more than an area of the upper surface of the dot-form adhesive agent.

2. A transfer tool, comprising the adhesive product according to claim 1, that is used as a pressure-sensitive transfer tape.

3. The adhesive product of claim 1, wherein a diameter of the upper surface of the dot-form adhesive agent is considered as the dot diameter of the dot-form adhesive agent.

4. The adhesive product of claim 1, wherein when any one of the dots is in a non-complete circular form, a diameter of a circumscribed circle of the dot-form adhesive agent is defined as the dot diameter.

5. The adhesive product of claim 1, wherein, in each of the dots of the dot-form adhesive agent, an area of the lower surface of the dot-form adhesive agent is more than an area of the upper surface of the dot-form adhesive agent.

6. The adhesive product of claim 1, wherein an adhesive force of the adhesive product is equal to or more than 6.6 o 7.8 (N/25 mm).

* * * * *